United States Patent
Yamasaki et al.

(10) Patent No.: US 11,552,533 B2
(45) Date of Patent: Jan. 10, 2023

(54) STATOR ASSEMBLY, MOTOR, AND FAN MOTOR

(71) Applicant: Nidec Corporation, Kyoto (JP)

(72) Inventors: Yuta Yamasaki, Kyoto (JP); Hideki Aoi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 598 days.

(21) Appl. No.: 16/668,105

(22) Filed: Oct. 30, 2019

(65) Prior Publication Data

US 2020/0161941 A1 May 21, 2020

(30) Foreign Application Priority Data

Nov. 20, 2018 (JP) .............................. JP2018-217658

(51) Int. Cl.
| | |
|---|---|
| *H02K 11/215* | (2016.01) |
| *H02K 7/14* | (2006.01) |
| *F04D 19/00* | (2006.01) |
| *H02K 21/22* | (2006.01) |
| *H02K 11/30* | (2016.01) |

(52) U.S. Cl.
CPC ......... *H02K 11/215* (2016.01); *F04D 19/002* (2013.01); *H02K 7/14* (2013.01); *H02K 11/30* (2016.01); *H02K 21/22* (2013.01); *H02K 2211/03* (2013.01)

(58) Field of Classification Search
CPC ........ H02K 11/215; H02K 7/14; H02K 11/30; H02K 21/22; H02K 2211/03; H02K 29/08; H02K 11/20; F04D 19/002; F04D 25/0646
USPC ................................................... 310/323.04
See application file for complete search history.

(56) References Cited

U.S. PATENT DOCUMENTS

| | | | |
|---|---|---|---|
| 8,492,939 B2 | 7/2013 | Hasegawa et al. | |
| 2007/0126296 A1 | 6/2007 | Lee et al. | |
| 2013/0236339 A1 | 9/2013 | Oguma | |
| 2014/0314596 A1 | 10/2014 | Kudo et al. | |
| 2018/0076696 A1* | 3/2018 | Mizuike | H02K 5/1735 |
| 2018/0166942 A1* | 6/2018 | Aoi | H02K 5/08 |

FOREIGN PATENT DOCUMENTS

| | | |
|---|---|---|
| CN | 102545480 A | 7/2012 |
| CN | 202503407 | * 10/2012 |
| JP | 2013-187922 A | 9/2013 |
| TW | 265666 B | 11/2006 |

OTHER PUBLICATIONS

Official Communication issued in corresponding Chinese Patent Application No. 201911114621.1, dated Mar. 8, 2022.
Official Communication issued in corresponding Chinese Patent Application No. 201911114621.1, dated Sep. 15, 2021.

* cited by examiner

*Primary Examiner* — Ahmed Elnakib
(74) *Attorney, Agent, or Firm* — Keating & Bennett (57) ABSTRACT

A stator assembly includes a stator that opposes a rotor, which rotates about a central axis extending vertically, in a radial direction, a cover that accommodates an axially upper portion of the stator, a base portion that covers at least an axially lower side of the stator, and a circuit board that opposes the base portion in an axial direction and includes a sensor. At least one of the cover and the base portion includes a positioning portion, which is adjacent to the circuit board in the axial direction, the positioning portion being adjacent to the sensor.

17 Claims, 8 Drawing Sheets

STATOR ASSEMBLY, MOTOR, AND FAN MOTOR

CROSS REFERENCE TO RELATED APPLICATION

The present application claims priority under 35 U.S.C. § 119 to Japanese Application No. 2018-217658 filed on Nov. 20, 2018, the entire contents of which are hereby incorporated herein by reference.

1. FIELD OF THE INVENTION

The present disclosure relates to a stator assembly, a motor, and a fan motor.

2. BACKGROUND

In conventional fan motors, a stator including a winding and a circuit board are covered with an electrical insulator. The electrical insulator is a mold resin. As a result, the stator and the circuit board can be protected by the mold resin, and dustproof and moisture-proof measures can be applied to the motor.

SUMMARY

A first example embodiment of a stator assembly of the present disclosure includes a stator that opposes a rotor, which rotates about a central axis extending vertically, in a radial direction, a cover that accommodates at least an axially upper portion of the stator, a base portion that covers at least an axially lower side of the stator, and a circuit board that opposes the base portion in an axial direction and includes a sensor. At least one of the cover and the base portion includes a positioning portion, which is adjacent to the circuit board in the axial direction, the positioning portion being adjacent to the sensor.

An example embodiment of a motor of the present disclosure includes the stator assembly configured as described above with the rotor being rotatable about the central axis together with a magnet opposing the stator assembly in the radial direction.

An example embodiment of a fan motor of the present disclosure includes the motor configured as described above, a housing, and an impeller.

The above and other elements, features, steps, characteristics and advantages of the present disclosure will become more apparent from the following detailed description of the example embodiments with reference to the attached drawings.

DETAILED DESCRIPTION

Figure 2:
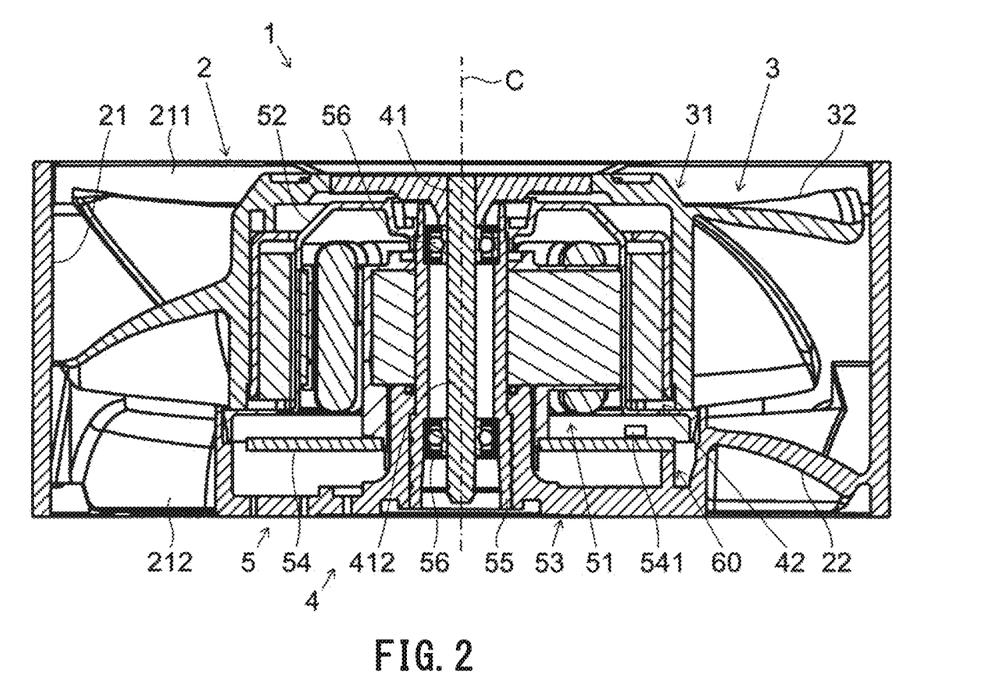
FIG. 2 is a longitudinal sectional view of the fan motor.

Hereinafter, example embodiments of the present disclosure will be described in detail with reference to the accompanying drawings. In the present specification, it is assumed that a direction in which a central axis of a fan motor extends is referred to simply as the term "axial direction", "axial", or "axially", that directions perpendicular to the central axis of the fan motor and centered on the central axis are each referred to simply as the term "radial direction", "radial", or "radially", and that a direction along a circular arc centered on the central axis of the fan motor is referred to simply as the term "circumferential direction", "circumferential", or "circumferentially". In the present specification, it is also assumed that the axial direction is a vertical direction for the sake of convenience of the description, and shapes and positional relations of portions will be described on the assumption that the vertical direction in FIG. 2 is a vertical direction of the fan motor. An "upper side" of the fan motor is an "intake side", and a "lower side" is an "exhaust side". Note that the above definition of the vertical direction does not restrict the orientations and positional relations of the fan motor when in use. In the present specification, a cross section parallel to the axial direction is referred to as a "longitudinal cross section", and a sectional view of a cut portion parallel to the axial direction is referred to as a "longitudinal sectional view". Note that the terms "parallel" and "perpendicular" used in the present specification include not only those "exactly parallel" and "exactly perpendicular", respectively, but also those "substantially parallel" and "substantially perpendicular", respectively.

Figure 1:
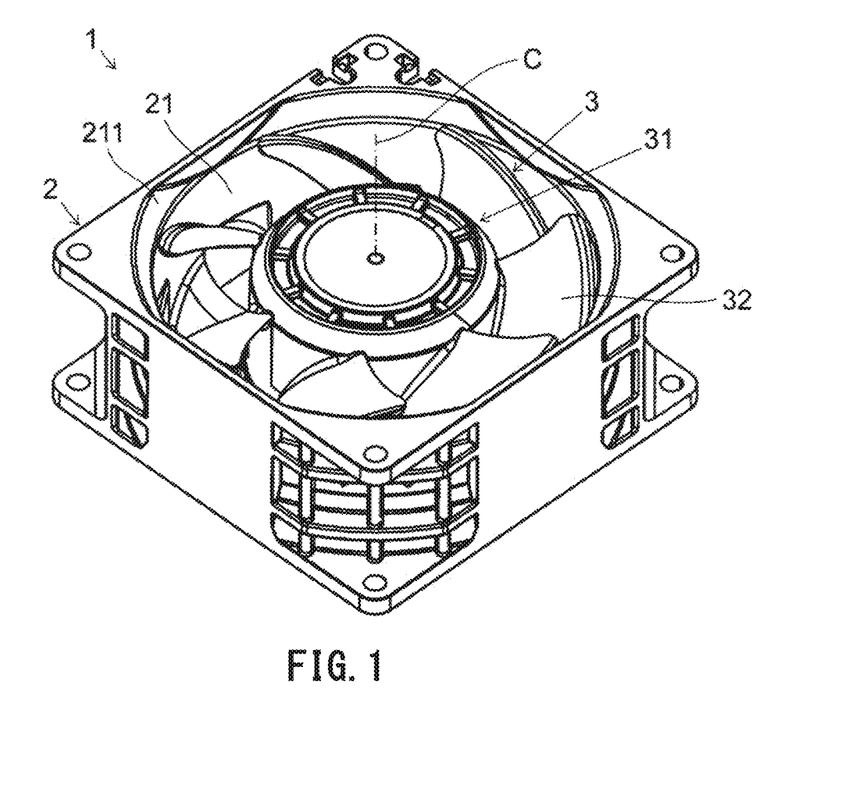
FIG. 1 is an overall perspective view of an example of a fan motor according to an example embodiment of the present disclosure.
Figure 3:
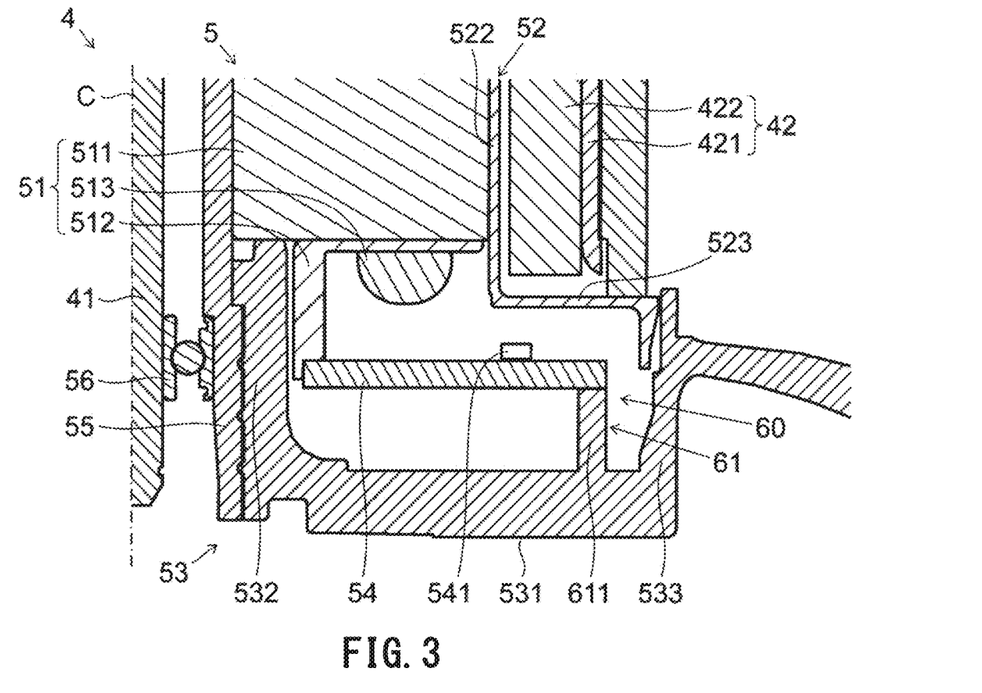
FIG. 3 is a longitudinal sectional view illustrating a portion of a stator assembly according to an example embodiment of the present disclosure.

FIG. 1 is an overall perspective view of an example of a fan motor 1 according to an example embodiment of the present disclosure. FIG. 2 is a longitudinal sectional view of the fan motor 1. FIG. 3 is a longitudinal sectional view illustrating a part of a motor 4.

The fan motor 1 is an outer rotor type fan motor. The fan motor 1 includes a housing 2, an impeller 3, and a motor 4. That is, the fan motor 1 according to the present example embodiment includes the motor 4.

The housing 2 is arranged on the outer side of the impeller 3 and the motor 4. The housing 2 includes a housing tube portion 21 and rib portions 22.

The housing tube portion 21 is arranged on the radially outer side of the impeller 3. The housing tube portion 21 has a cylindrical shape that extends vertically in the axial direction. The impeller 3 and the motor 4 are accommodated in the housing tube portion 21. An intake port 211, which is a circular opening, is arranged at an axially upper end of the housing tube portion 21. An exhaust port 212, which is a circular opening, is arranged at an axially lower end of the housing tube portion 21.

The rib portion 22 is arranged on the radially inner side of the housing tube portion 21. The rib portion 22 is arranged at an axially lower portion of the housing tube portion 21 and is adjacent to the exhaust port 212. An outer end of the rib portion 22 in a direction perpendicular to the axial direction is connected to a radially inner surface of the housing tube portion 21. An inner end of the rib portion 22 in the direction perpendicular to the axial direction is connected to a radially outer surface of a base portion 53 to be described later. The rib portion 22 extends in the direction perpendicular to the axial direction and connects the housing tube portion 21 and the base portion 53. That is, the housing 2 supports the motor 4 via the rib portion 22. The plurality of rib portions 22 are arranged in the circumferential direction. Air flowing through the radially inner side of the housing tube portion 21 passes between the adjacent rib portions 22.

The impeller 3 is arranged on the radially inner side of the housing 2, that is, on the radially outer side of the motor 4. The impeller 3 is rotated about a central axis C by the motor 4. The impeller 3 includes an impeller cup 31 and a plurality of blades 32.

The motor 4 is arranged on the radially inner side of the housing 2. The motor 4 is supported by the housing 2 via the rib portion 22. The motor 4 rotates the impeller 3 about the central axis C. The motor 4 includes a shaft 41, a rotor 42, and a stator assembly 5.

The shaft 41 is arranged along the central axis C. The shaft 41 is a columnar member that is made of metal, for example, aluminum, stainless steel, or the like and extends vertically. The shaft 41 is supported by a bearing 56, which will be described later, so as to be rotatable about the central axis C. That is, the shaft 41 rotates about the central axis C extending vertically. The impeller 3 is connected to an axially upper end of the shaft 41.

The rotor 42 is arranged on the radially outer side of the stator assembly 5. The rotor 42 rotates about the central axis C with respect to the stator assembly 5. The rotor 42 includes a rotor yoke 421 and a magnet 422. The rotor 42 is connected to the impeller 3 and the shaft 41.

A rotor yoke 421 is a substantially cylindrical member made of a magnetic material. The rotor yoke 421 is fixed on the radially inner side of the impeller cup 31. The magnet 422 has a cylindrical shape and is fixed to the radially inner side of the rotor yoke 421. The magnet 422 is arranged on the radially outer side of the stator 51 and opposes the stator assembly 5 in the radial direction. N poles and S poles are alternately arranged in the circumferential direction on a magnetic pole surface on the inner circumferential side of the magnet 422.

The stator assembly 5 is arranged on the radially inner side of the rotor 42. The stator assembly 5 includes the stator 51, a cover 52, a base portion 53, and a circuit board 54. The stator assembly 5 further includes a bearing holder 55 and the bearing 56.

The stator 51 is fixed to a radially outer surface of the tubular bearing holder 55 that holds the bearing 56. The stator 51 has an annular shape centered on the central axis C. The stator 51 opposes the rotor 42, which rotates about the vertically extending central axis C, in the radial direction. The stator 51 includes a stator core 511, and insulator 512, and a coil 513.

The stator core 511 is configured by vertically stacking electromagnetic steel plates, for example, silicon steel plates or the like. The stator core 511 is fixed to the radially outer surface of the bearing holder 55. The radially outer surface of the stator core 511 opposes a radially inner surface of the magnet 422 in the radial direction.

The insulator 512 is made of, for example, a resin having an insulating property. The insulator 512 is provided so as to surround an outer surface of the stator core 511. The coil 513 is configured using a conductive wire wound around the stator core 511 with the insulator 512 interposed therebetween. The conductive wire is electrically connected to the circuit board 54.

The cover 52 is arranged on the axially upper side and the radially outer side of the stator 51. The cover 52 of the present example embodiment accommodates at least an axially upper portion of the stator 51. More specifically, the stator 51 opposes the rotor 42 in the radial direction with the cover 52 interposed therebetween. The cover 52 includes a cover lid portion 521, a cover tube portion 522, and a flange portion 523.

The cover lid portion 521 is arranged on the axially upper side of the stator 51 and expands in the radial direction with the central axis C as the center. A radially inner end of the cover lid portion 521 is in contact with a radially outer surface of the bearing holder 55. A radially outer end of the cover lid portion 521 is connected to an axially upper end of the cover tube portion 522.

The cover tube portion 522 is arranged on the radially outer side of the stator 51 and extends vertically along the axial direction. A radially inner surface of the cover tube portion 522 opposes a radially outer surface of the stator 51. An axially lower end of the cover tube portion 522 is connected to a radially inner end of the flange portion 523.

The flange portion 523 extends from the axially lower end of the cover tube portion 522 to the radially outer side. The flange portion 523 has an annular shape that expands in the radial direction with the central axis C as the center. A radially outer end of the flange portion 523 is in contact with a base outer tube portion 533 of the base portion 53 which will be described later.

The base portion 53 is arranged at an axially lower end of the fan motor 1 on the axially lower side of the stator 51. The base portion 53 of the present example embodiment covers at least the axially lower side of the stator 51. The base portion 53 includes a base lid portion 531, a base inner tube portion 532, and the base outer tube portion 533.

The base lid portion 531 has an annular shape that is arranged on the axially lower side of the stator 51 and expands in the radial direction with the central axis C as the center. A radially inner end of the base lid portion 531 is connected to an axially lower end of the base inner tube portion 532. A radially outer end of the base lid portion 531 is connected to an axially lower end of the base outer tube portion 533.

The base inner tube portion 532 has a tubular shape that extends vertically along the axial direction. The base inner tube portion 532 is in contact with the bearing holder 55 on a radially inner surface and holds the bearing holder 55. An axially upper portion of the base inner tube portion 532 is adjacent to the stator core 511 and the insulator 512.

The base outer tube portion 533 extends vertically along the axial direction. An axially upper end of the base outer tube portion 533 is in contact with the flange portion 523 of the cover 52.

The circuit board 54 is arranged on the axially lower side of the flange portion 523 of the cover 52 and the stator 51 and on the axially upper side of the base portion 53. That is, the circuit board 54 of the present example embodiment opposes the cover 52 and the base portion 53 in the axial direction. The circuit board 54 has, for example, a disk shape that extends in the radial direction with the central axis C as the center. The conductive wire of the coil 513 is electrically connected to the circuit board 54.

An electric circuit configured to supply a drive current to the coil 513 is mounted on the circuit board 54. For example, a sensor 541 is mounted on an axially upper surface of the circuit board 54. That is, the circuit board 54 of the present example embodiment includes the sensor 541 between the cover 52 and the base portion 53. The sensor 541 of the present example embodiment is a magnetic sensor that senses magnetism. The sensor 541 is arranged on the axially lower side of the magnet 422 and opposes the magnet 422 in the axial direction. The sensor 541 detects a position of the rotor 42 in the circumferential direction.

The bearing holder 55 is arranged on the radially inner side of the stator 51 and the base inner tube portion 532. The bearing holder 55 has a cylindrical shape centered on the central axis C. An axially lower portion of the bearing holder 55 is fixed to the base inner tube portion 532. An axially upper end of the bearing holder 55 is located on the axially upper side of the stator 51. The bearing 56 is accommodated and held inside the bearing holder 55 in the radial direction. The stator core 511 is fixed to the radially outer surface of the bearing holder 55.

When a drive current is supplied to the coil 513 of the stator 51 via the circuit board 54 in the fan motor 1 configured as described above, magnetic flux in the radial direction is generated in the stator core 511. As a magnetic field generated by the magnetic flux of the stator 51 and a magnetic field generated by the magnet 422 act on each other, torque is generated in the circumferential direction of the rotor 42. Due to this torque, the rotor 42 and the impeller 3 rotate about the central axis C. When the impeller 3 rotates, an air flow is generated by the plurality of blades 32. That is, in the fan motor 1, it is possible to generate and blow the air flow with the upper side as the intake side and the lower side as the exhaust side.

The stator assembly 5 includes a positioning portion 60. Specifically, the base portion 53 of the present example embodiment includes the positioning portion 60. The positioning portion 60 is arranged in the vicinity of the sensor 541 to be adjacent to the circuit board 54 in the axial direction. Note that the vicinity of sensor 541 means a positional relationship in which a distance between the sensor 541 and the positioning portion 60 is shorter than a distance between the sensor 541 and a radially outer surface of the circuit board 54. The positioning portion 60 may be in contact with the circuit board 54 or may be separated from the circuit board 54 with a gap.

As will be described later as a modification of the present example embodiment, the positioning portion 60 only has to be provided on at least one of the cover 52 and the base portion 53. That is, at least one of the cover 52 and the base portion 53 of the present example embodiment includes the positioning portion 60 that is arranged in the vicinity of the sensor 541 to be adjacent to the circuit board 54 in the axial direction.

According to the above configuration, the positioning portion 60 can suppress axial displacement toward the base portion 53 or axial displacement toward the cover 52 in the vicinity of the sensor 541 of the circuit board 54. Accordingly, it is possible to position the sensor 541 of the circuit board 54 with high accuracy.

Since the sensor 541 is the magnetic sensor that senses magnetism, and thus, can detect positions of the magnet 422 of the rotor 42. As a result, the rotation of the motor 4 can be controlled with high accuracy.

The positioning portion 60 of the present example embodiment includes a base-side positioning portion 61 arranged on the base portion 53. The base-side positioning portion 61 is arranged on the axially upper side of the base lid portion 531 of the base portion 53. An axially upper end of the base-side positioning portion 61 is adjacent to the circuit board 54 in the axial direction. According to this configuration, the axial displacement of the circuit board 54 toward the base portion 53 can be suppressed. Therefore, the sensor 541 of the circuit board 54 can be positioned with high accuracy.

The base-side positioning portion 61 includes a base-side convex portion 611. The base-side convex portion 611 is arranged on the base portion 53 to be adjacent to the circuit board 54 in the axial direction from the base portion 53 side. The base-side convex portion 611 protrudes from the base lid portion 531 of the base portion 53 toward the axially upper side. That is, the base-side positioning portion 61 of the present example embodiment includes the base-side convex portion 611 that protrudes toward the circuit board 54. The base-side convex portion 611 is columnar, for example. An axially upper end of the base-side convex portion 611 is adjacent to the circuit board 54 in the axial direction.

According to the above configuration, the base-side convex portion 611 comes into contact with the circuit board 54 in the vicinity of the sensor 541, for example, when the circuit board is deformed. Thus, the axial displacement toward the base portion 53 in the vicinity of the sensor 541 of the circuit board 54 can be suppressed. Therefore, the sensor 541 of the circuit board 54 can be positioned with high accuracy.

In addition, a space can be secured between the base portion 53 and the circuit board 54, and the space can be effectively used for the arrangement of electronic components.

At least a part of the positioning portion 60 is arranged on the radially outer side of the sensor 541. According to this configuration, it is possible to increase the degree of freedom of the arrangement of electronic components on the circuit board 54.

The base-side positioning portion 61 arranged on the axially upper side of the base lid portion 531 of the base portion 53 may have a different configuration from the base-side convex portion 611. For example, the base-side positioning portion 61 can be configured by a support tool attached to the axially upper side of the base lid portion 531. That is, it suffices that the base-side positioning portion 61 is arranged in the vicinity of the sensor 541 to be adjacent to the circuit board 54 in the axial direction. As a result, the axial displacement toward the base portion 53 in the vicinity of the sensor 541 of the circuit board 54 can be suppressed.

Figure 4:
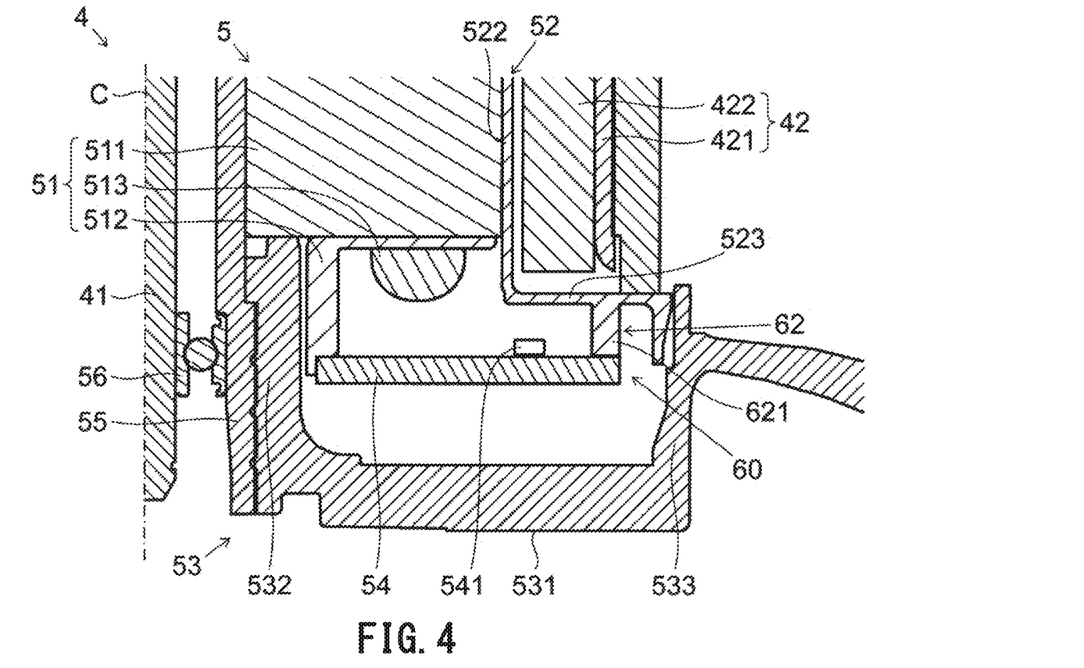
FIG. 4 is a longitudinal sectional view illustrating a portion of a stator assembly according to a first modification of an example embodiment of the present disclosure.

FIG. 4 is a longitudinal sectional view illustrating a part of the stator assembly 5 according to a first modification. In the stator assembly 5 of the first modification, the positioning portion 60 includes a cover-side positioning portion 62 arranged on the cover 52. The cover-side positioning portion 62 is arranged on the axially lower side of the flange portion 523 of the cover 52. An axially lower end of the cover-side positioning portion 62 is adjacent to the circuit board 54 in the axial direction. According to this configuration, axial displacement of the circuit board 54 toward the cover 52 can be suppressed. Therefore, the sensor 541 of the circuit board 54 can be positioned with high accuracy.

The cover-side positioning portion 62 includes a cover-side convex portion 621. The cover-side convex portion 621 is arranged on the cover 52 to be adjacent to the circuit board 54 in the axial direction from the cover 52 side. The cover-side convex portion 621 protrudes from the flange portion 523 of the cover 52 toward the axially lower side. That is, the cover-side positioning portion 62 of the present example embodiment includes the cover-side convex portion 621 that protrudes toward the circuit board 54. The cover-side convex portion 621 is, for example, columnar. An axially lower end of the cover-side convex portion 621 is adjacent to the circuit board 54 in the axial direction.

According to the above configuration, the cover-side convex portion 621 comes into contact with the circuit board 54 in the vicinity of the sensor 541, for example, when the circuit board 54 is deformed. Thus, the axial displacement toward the cover 52 in the vicinity of the sensor 541 of the circuit board 54 can be suppressed. Therefore, the sensor 541 of the circuit board 54 can be positioned with high accuracy.

In addition, a space can be secured between the cover 52 and the circuit board 54, and the space can be effectively used for the arrangement of electronic components.

At least a part of the positioning portion 60 overlaps with the sensor 541 in the radial direction. According to this configuration, the positioning portion 60 can be placed to be as close as possible to the sensor 541 in the circumferential direction. In addition, at least a part of the positioning portion 60 is arranged on the radially outer side of the sensor 541. According to this configuration, it is possible to increase the degree of freedom of the arrangement of electronic components on the circuit board 54.

The cover-side positioning portion 62 arranged on the lower side in the axial direction of the flange portion 523 of the cover 52 may have a different configuration from the cover-side convex portion 621. For example, the cover-side positioning portion 62 can be configured by a support tool attached to the axially lower side of the flange portion 523. That is, it suffices that the cover-side positioning portion 62 is arranged in the vicinity of the sensor 541 to be adjacent to the circuit board 54 in the axial direction. As a result, the axial displacement toward the cover 52 in the vicinity of the sensor 541 of the circuit board 54 can be suppressed.

Figure 5:
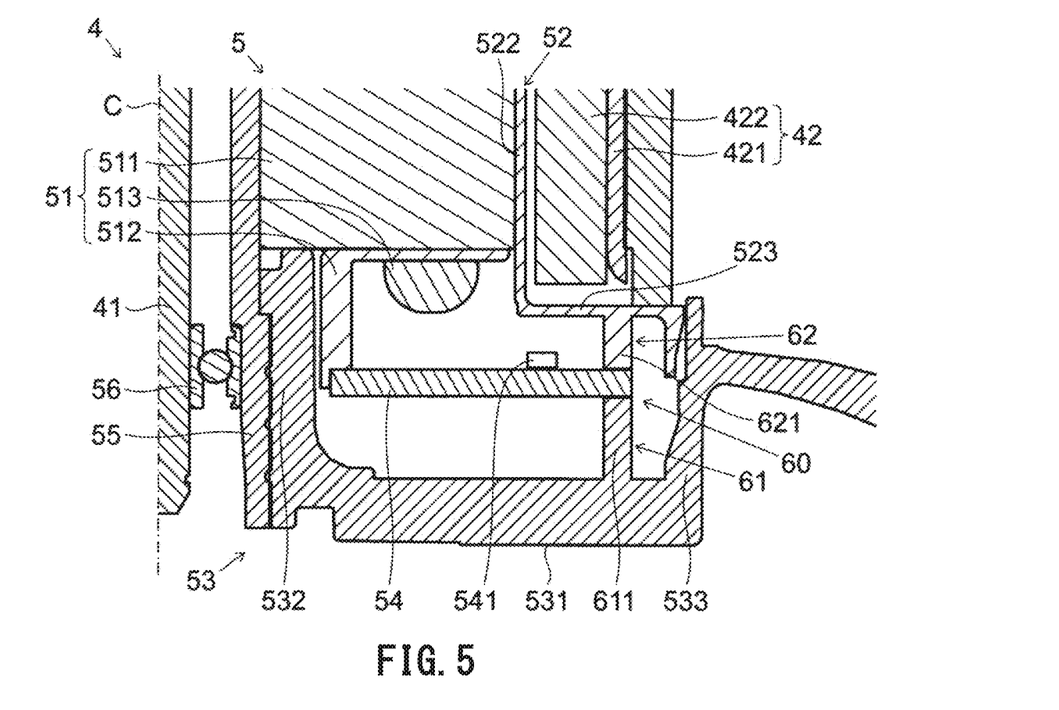
FIG. 5 is a longitudinal sectional view illustrating a portion of a stator assembly according to a second modification of an example embodiment of the present disclosure.

FIG. 5 is a longitudinal sectional view illustrating a part of the stator assembly 5 according to a second modification. In the stator assembly 5 of the second modification, the positioning portion 60 includes the base-side positioning portion 61 arranged on the base portion 53 and the cover-side positioning portion 62 arranged on the cover 52. The base-side positioning portion 61 is arranged on the axially upper side of the base lid portion 531 of the base portion 53. An axially upper end of the base-side positioning portion 61 is adjacent to the circuit board 54 in the axial direction. The cover-side positioning portion 62 is arranged on the axially lower side of the flange portion 523 of the cover 52. An axially lower end of the cover-side positioning portion 62 is adjacent to the circuit board 54 in the axial direction.

According to the above configuration, axial displacement toward the base portion 53 and axial displacement toward the cover of the circuit board 54 can be suppressed. Therefore, the sensor 541 of the circuit board 54 can be positioned with high accuracy.

The base-side positioning portion 61 includes a base-side convex portion 611. The base-side convex portion 611 is arranged on the base portion 53 to be adjacent to the circuit board 54 in the axial direction from the base portion 53 side. The base-side convex portion 611 protrudes from the base lid portion 531 of the base portion 53 toward the axially upper side. That is, the base-side positioning portion 61 of the present example embodiment includes the base-side convex portion 611 that protrudes toward the circuit board 54. The base-side convex portion 611 is columnar, for example. An axially upper end of the base-side convex portion 611 is adjacent to the circuit board 54 in the axial direction.

The cover-side positioning portion 62 includes a cover-side convex portion 621. The cover-side convex portion 621 is arranged on the cover 52 to be adjacent to the circuit board 54 in the axial direction from the cover 52 side. The cover-side convex portion 621 protrudes from the flange portion 523 of the cover 52 toward the axially lower side. That is, the cover-side positioning portion 62 of the present example embodiment includes the cover-side convex portion 621 that protrudes toward the circuit board 54. The cover-side convex portion 621 is, for example, columnar. An axially lower end of the cover-side convex portion 621 is adjacent to the circuit board 54 in the axial direction.

According to the above configuration, the base-side convex portion 611 comes into contact with the circuit board 54 in the vicinity of the sensor 541, for example, when the circuit board 54 is deformed. For example, when the circuit board 54 is deformed, the cover-side convex portion 621 comes into contact with the circuit board 54 in the vicinity of the sensor 541. Thus, each of the axial displacement toward the base portion 53 and the axial displacement toward the cover 52 in the vicinity of the sensor 541 of the circuit board 54 can be suppressed. Therefore, the sensor 541 of the circuit board 54 can be positioned with high accuracy.

In addition, each space can be secured between the base portion 53 and the circuit board 54 and between the cover 52 and the circuit board 54, and thus, these spaces can be effectively used for the arrangement of electronic components.

At least a part of the base-side positioning portion 61 overlaps with at least a part of the cover-side positioning portion 62 in the axial direction. That is, at least a part of an axially upper end of the base-side positioning portion 61 opposes at least a part of an axially lower end of the cover-side positioning portion 62 in the axial direction with the circuit board 54 interposed therebetween. According to this configuration, the vicinity of the sensor 541 of the circuit board 54 is hardly displaced either upward or downward in the axial direction. Therefore, it is possible to position the sensor 541 of the circuit board 54 with higher accuracy.

Figure 6:
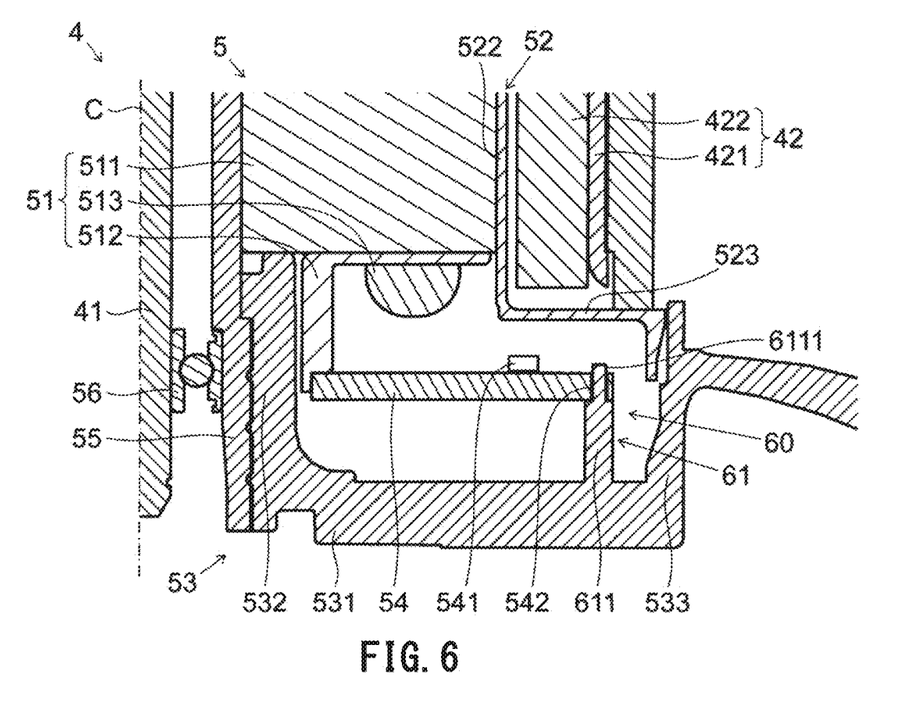
FIG. 6 is a longitudinal sectional view illustrating a portion of a stator assembly according to a third modification of an example embodiment of the present disclosure.

FIG. 6 is a longitudinal sectional view illustrating a part of the stator assembly 5 according to a third modification. In the stator assembly 5 of the third modification, the positioning portion 60 includes the base-side positioning portion 61 arranged on the base portion 53. The positioning portion 60 includes the base-side convex portion 611. The base-side convex portion 611 further includes a shaft portion 6111.

The shaft portion 6111 is arranged at at least one axial end of the base-side convex portion 611 and the cover-side convex portion 621, and extends in the axial direction. The shaft portion 6111 has a columnar shape that is smaller than the base-side convex portion 611 in the circumferential direction or radial direction, for example. The shaft portion 6111 is provided on the circuit board 54 and is inserted into a hole 542 or a notch that vertically penetrates the circuit board 54. Therefore, the positioning portion 60 including the shaft portion 6111 is arranged to be adjacent to the circuit board 54 in the circumferential direction.

According to the above configuration, an inner surface of the hole 542 of the circuit board 54 comes into contact with an outer surface of the shaft portion 6111, for example, when the circuit board 54 is deformed or displaced in the circumferential direction. Thus, circumferential displacement in the vicinity of the sensor 541 on the circuit board 54 can be suppressed. Therefore, the sensor 541 of the circuit board 54 can be positioned with high accuracy.

Figure 7:
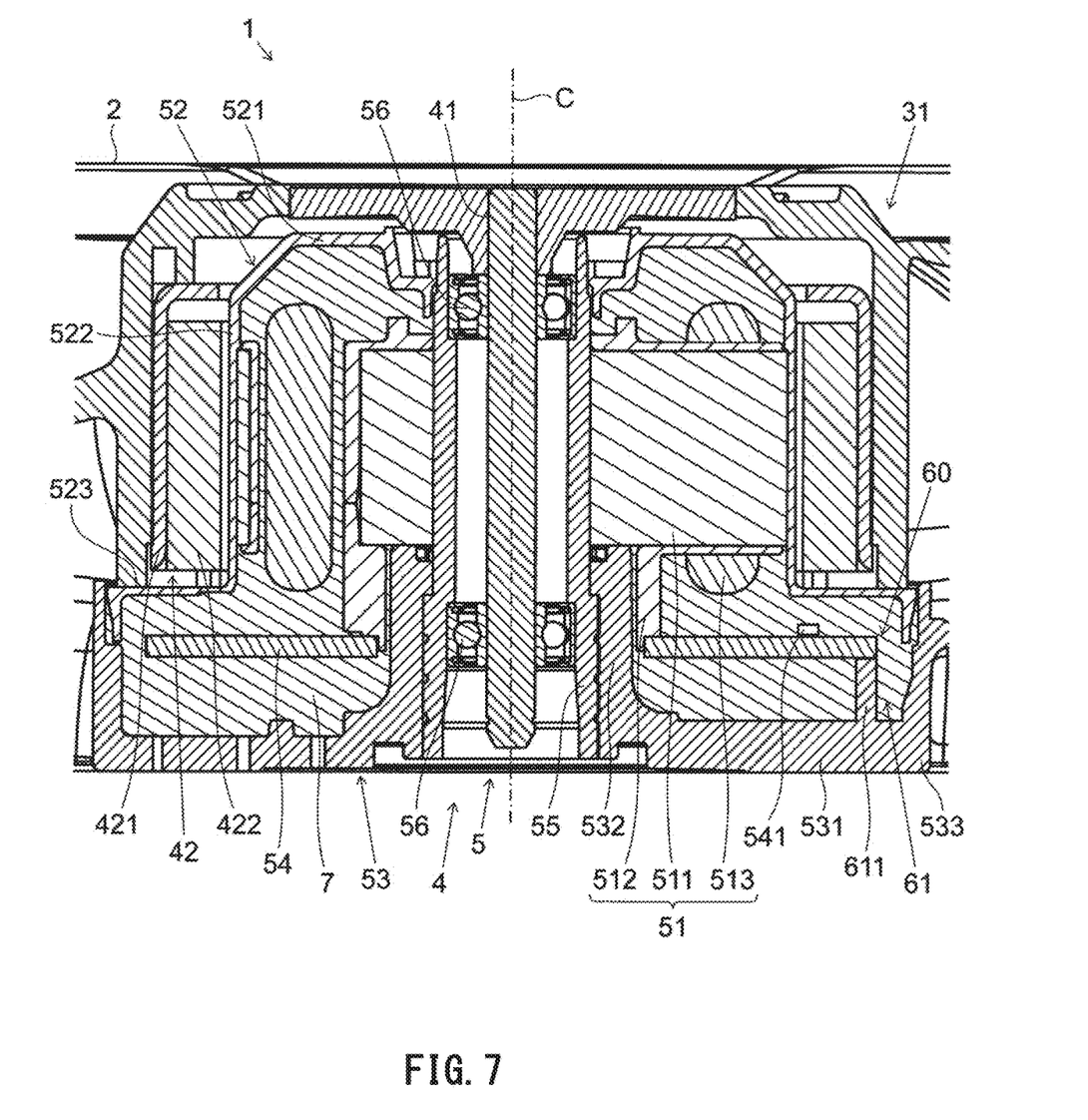
FIG. 7 is a longitudinal sectional view illustrating a stator assembly according to a fourth modification of an example embodiment of the present disclosure.

FIG. 7 is a longitudinal sectional view illustrating the stator assembly 5 according to a fourth modification. The stator assembly 5 of the fourth modification includes a filling portion 7. At least a space between the cover 52 and the stator 51 inside the cover 52 is filled with the filling portion 7. The filling portion 7 of the present example embodiment fills a space among the cover 52, the base portion 53, and the stator 51 inside the cover 52 and inside the base portion 53. The circuit board 54 of the present example embodiment is covered with the filling portion 7. A filling material forming the filling portion 7 is a synthetic resin material, for example, a silicone resin or the like. The filling material forming the filling portion 7 may be a natural resin material such as natural rubber.

According to the above configuration, the base-side convex portion 611 comes into contact with the circuit board 54 in the vicinity of the sensor 541 when the circuit board 54 is deformed due to shrinkage or expansion at the time of curing and a temperature change of the filling portion 7. Thus, the axial displacement toward the base portion 53 in the vicinity of the sensor 541 of the circuit board 54 can be suppressed. Therefore, the sensor 541 of the circuit board 54 can be positioned with high accuracy. Even if there is a gap between the circuit board 54 and the positioning portion 60, a position of the circuit board 54 can be stabilized by filling the gap with the resin material of the filling portion 7.

Figure 8:
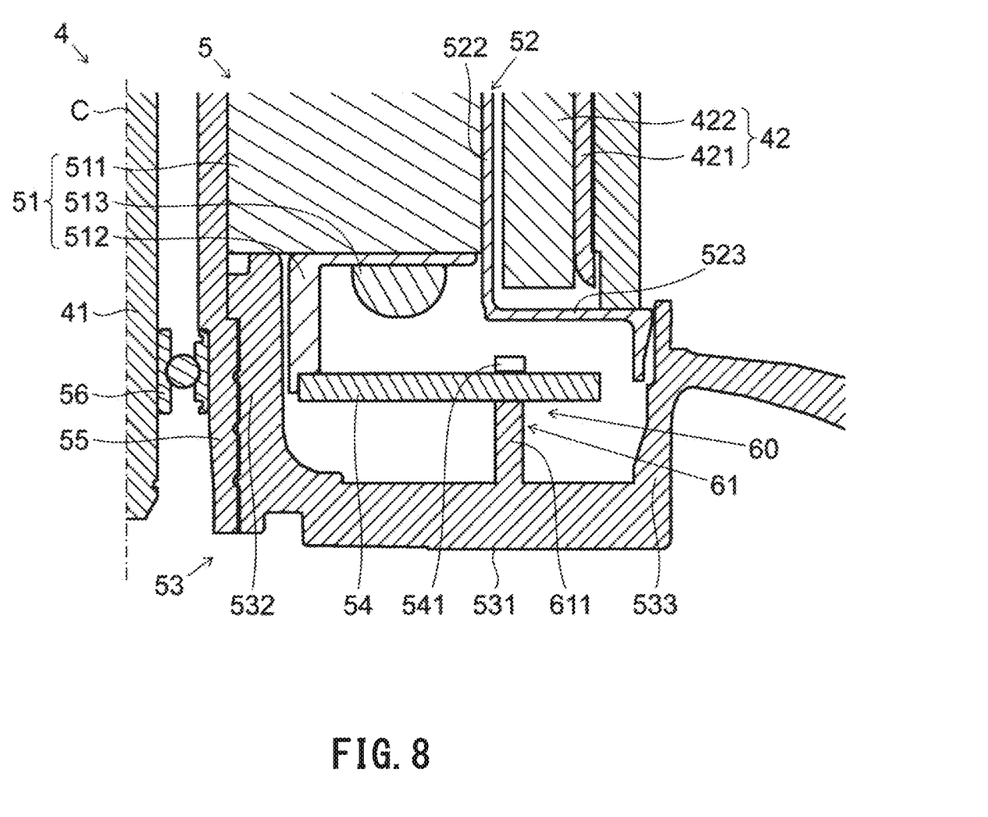
FIG. 8 is a longitudinal sectional view illustrating a portion of a motor according to a modification of an example embodiment of the present disclosure.

FIG. 8 is a longitudinal sectional view illustrating a part of the motor 4 according to a modification. The motor 4 of the modification includes the stator assembly 5 and the rotor 42. The rotor 42 rotates about the central axis C together with the magnet 422 opposing the stator assembly 5 in the radial direction. The positioning portion 60 includes the base-side positioning portion 61 arranged on the base portion 53. The positioning portion 60 further includes the base-side convex portion 611.

The base-side convex portion 611 is arranged on the axially lower side of the magnet 422. An axially upper end of the base-side convex portion 611 overlaps with an axially lower end of the magnet 422 in the axial direction. That is, at least a part of the positioning portion 60 of the present example embodiment overlaps with the magnet 422 in the axial direction. At least a part of the positioning portion 60 may overlap with the sensor 541 in the axial direction.

According to the above configuration, the sensor 541 of the circuit board 54 can be positioned with high accuracy in the motor 4. Further, positions of the magnet 422 of the rotor 42 can be detected by the sensor 541 positioned with high accuracy, and the rotation of the motor 4 can be controlled with high accuracy.

At least a part of the base-side positioning portion 61 overlaps with the sensor 541 in the axial direction. According to this configuration, the base-side positioning portion 61 comes into contact with the circuit board 54 immediately below the sensor 541, for example, when the circuit board 54 is deformed. Thus, axial displacement toward the base portion 53 of the sensor 541 of the circuit board 54 can be suppressed. Therefore, it is possible to position the sensor 541 of the circuit board 54 with higher accuracy.

While example embodiments of the present disclosure have been described above, the scope of the present disclosure is not limited thereto, and various modifications can be made without departing from a gist of the disclosure. In addition, features of the above-described preferred example embodiments and the modifications thereof may be combined appropriately as desired.

The present disclosure can be used in, for example, the fan motor.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator assembly comprising:
   a stator that opposes a rotor, which rotates about a central axis extending vertically, in a radial direction;
   a cover that accommodates at least an axially upper portion of the stator;
   a base portion that covers at least an axially lower side of the stator; and
   a circuit board that opposes the base portion in an axial direction and includes a sensor; wherein
   at least one of the cover and the base portion includes a positioning portion, which is adjacent to the circuit board in the axial direction, the positioning portion being adjacent to the sensor;
   the positioning portion includes a cover-side positioning portion on the cover; and
   the cover-side positioning portion includes a cover-side convex portion that protrudes toward the circuit board.

2. The stator assembly according to claim 1, wherein the circuit board opposes the cover and the base portion in the axial direction and includes a sensor between the cover and the base portion.

3. The stator assembly according to claim 1, wherein the positioning portion includes a base-side positioning portion on the base portion.

4. The stator assembly according to claim 3, wherein the base-side positioning portion includes a base-side convex portion that protrudes toward the circuit board.

5. The stator assembly according to claim 4, wherein at least a portion of the base-side positioning portion overlaps with the sensor in the axial direction.

6. The stator assembly according to claim 1, wherein the positioning portion includes a base-side positioning portion on the base portion and a cover-side positioning portion on the cover.

7. The stator assembly according to claim 6, wherein
   the base-side positioning portion includes a base-side convex portion that protrudes toward the circuit board; and
   the cover-side positioning portion includes a cover-side convex portion that protrudes toward the circuit board.

8. The stator assembly according to claim 6, wherein at least a portion of the base-side positioning portion and at least a portion of the cover-side positioning portion overlap in the axial direction.

9. The stator assembly according to claim 1, wherein at least a portion of the positioning portion overlaps with the sensor in the radial direction.

10. The stator assembly according to claim 9, wherein at least a portion of the positioning portion is on a radially outer side of the sensor.

11. The stator assembly according to claim 1, wherein the positioning portion is adjacent to the circuit board in the circumferential direction.

12. The stator assembly according to claim 1, wherein the sensor is a magnetic sensor that senses magnetism.

13. The stator assembly according to claim 1, further comprising:
   a filling portion filling a space between the cover and the stator at least inside the cover; wherein
   the circuit board is covered by the filling portion.

14. A motor comprising:
the stator assembly according to claim 1; and
the rotor that rotates about the central axis together with a magnet that opposes the stator assembly in the radial direction.

15. A fan motor comprising:
the motor according to claim 14;
a housing; and
an impeller.

16. A stator assembly comprising:
a stator that opposes a rotor, which rotates about a central axis extending vertically, in a radial direction;
a cover that accommodates at least an axially upper portion of the stator;
a base portion that covers at least an axially lower side of the stator; and
a circuit board that opposes the base portion in an axial direction and includes a sensor; wherein
at least one of the cover and the base portion includes a positioning portion, which is adjacent to the circuit board in the axial direction, the positioning portion being adjacent to the sensor;
the positioning portion includes a base-side positioning portion on the base portion and a cover-side positioning portion on the cover;
the base-side positioning portion includes a base-side convex portion that protrudes toward the circuit board; and
the cover-side positioning portion includes a cover-side convex portion that protrudes toward the circuit board.

17. A stator assembly comprising:
a stator that opposes a rotor, which rotates about a central axis extending vertically, in a radial direction;
a cover that accommodates at least an axially upper portion of the stator;
a base portion that covers at least an axially lower side of the stator; and
a circuit board that opposes the base portion in an axial direction and includes a sensor; wherein
at least one of the cover and the base portion includes a positioning portion, which is adjacent to the circuit board in the axial direction, the positioning portion being adjacent to the sensor;
the positioning portion includes a base-side positioning portion on the base portion and a cover-side positioning portion on the cover; and
at least a portion of the base-side positioning portion and at least a portion of the cover-side positioning portion overlap in the axial direction.

\* \* \* \* \*